M. J. KLEIN.
SIDE FORCE AND DANGER INDICATOR.
APPLICATION FILED JULY 11, 1917. RENEWED FEB. 28, 1920.
1,356,823.
Patented Oct. 26, 1920.
4 SHEETS—SHEET 3.
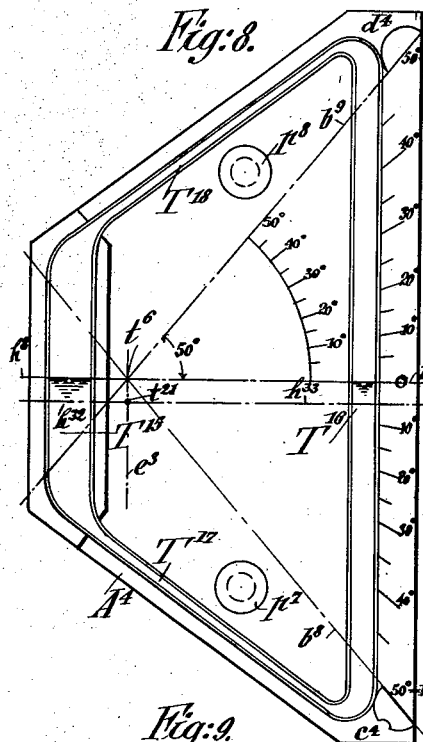
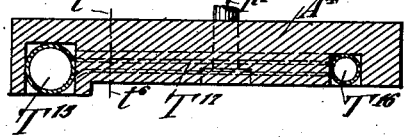
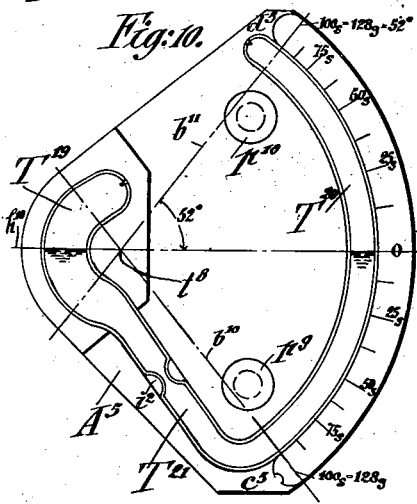
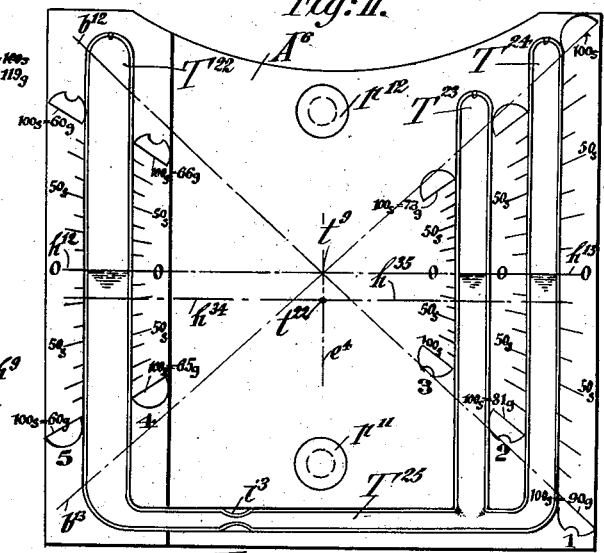
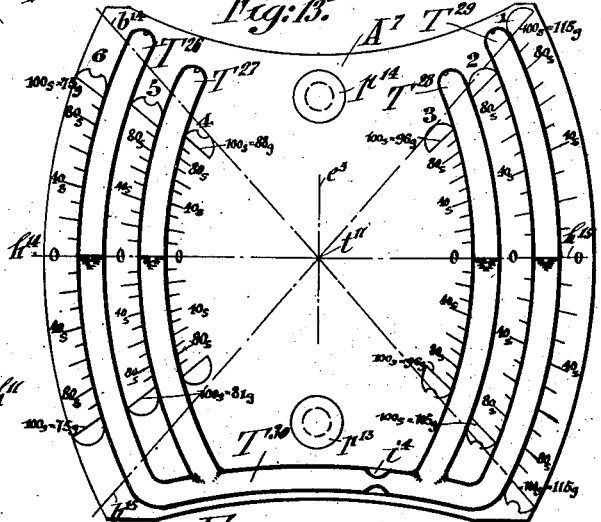
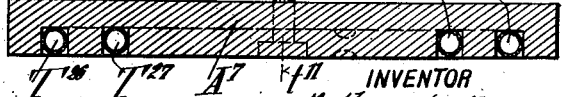
INVENTOR
Mathias J. Klein
BY Carl P. Goepel
ATTORNEY

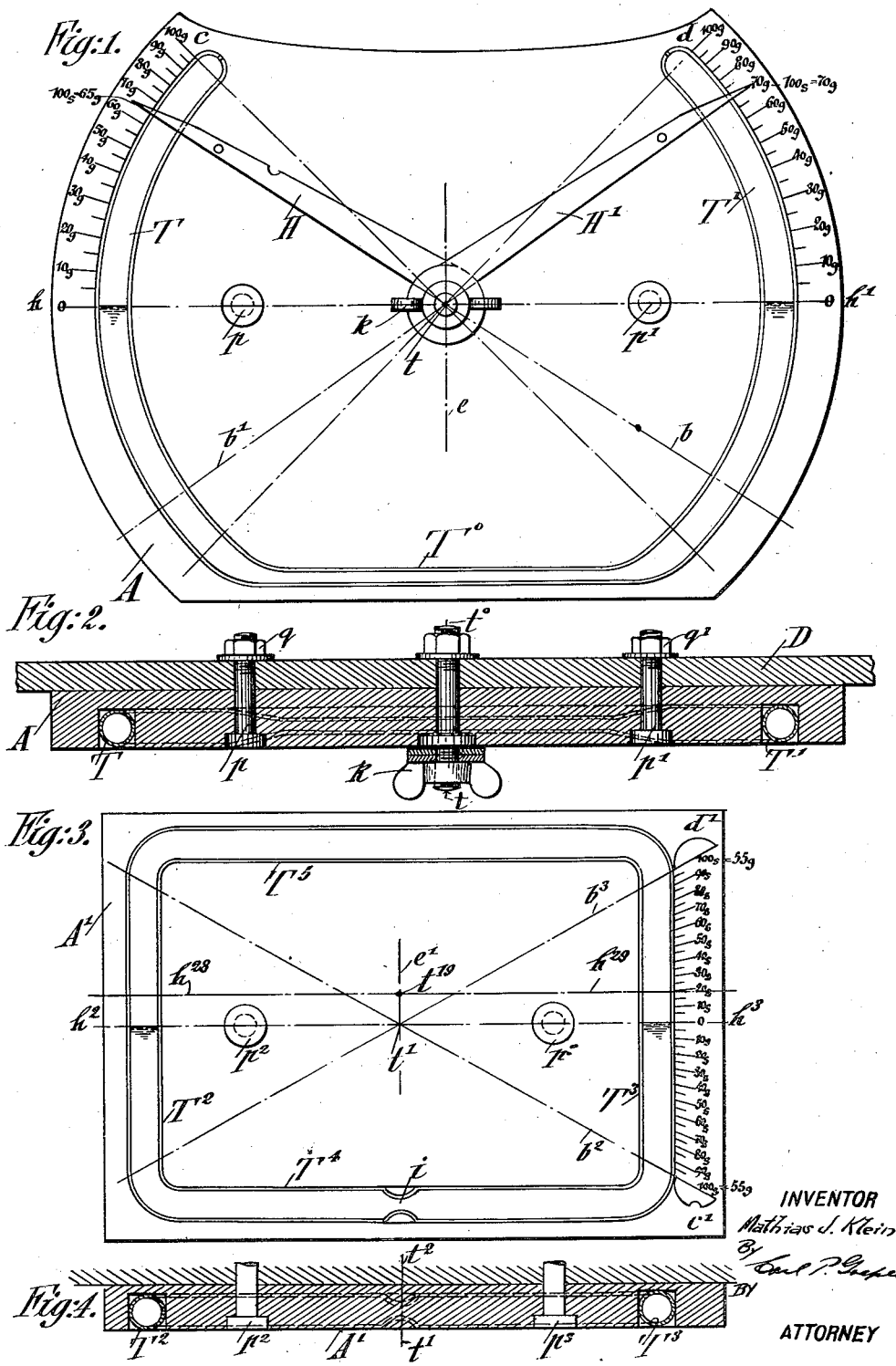

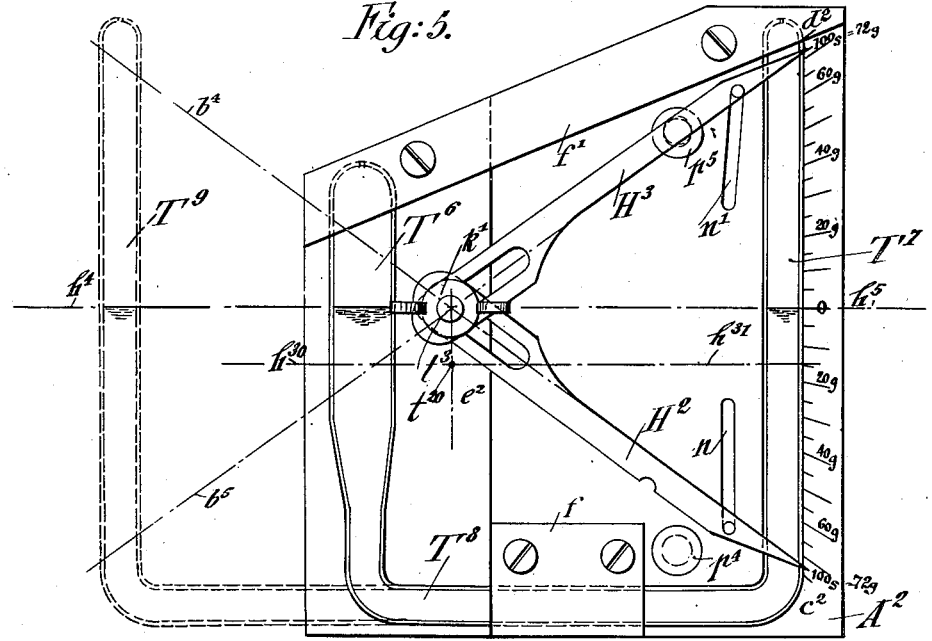
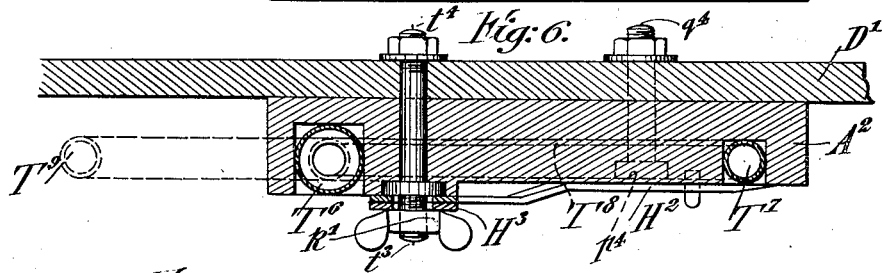
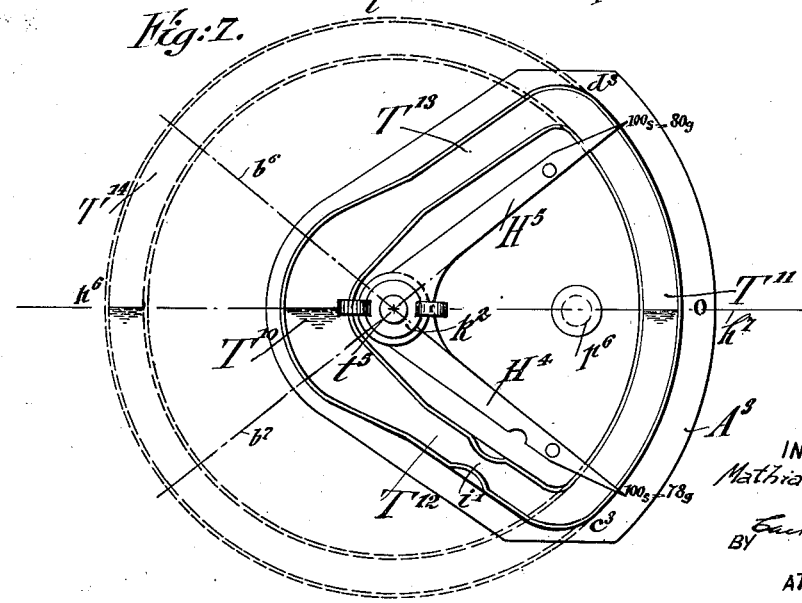

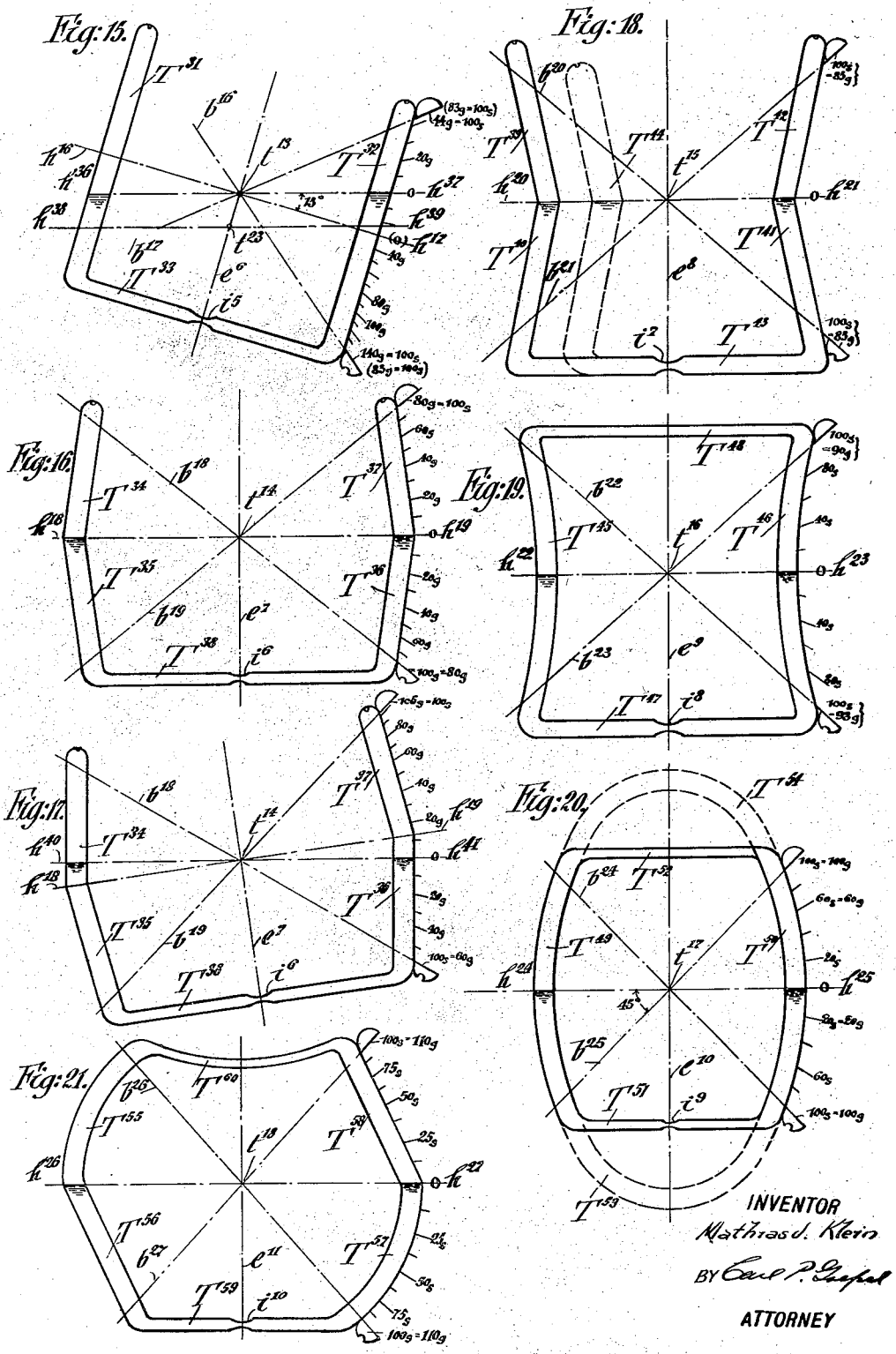

UNITED STATES PATENT OFFICE.

MATHIAS J. KLEIN, OF NEW YORK, N. Y., ASSIGNOR OF SIXTY ONE-HUNDREDTHS TO HUGO B. ROELKER, OF NEW YORK, N. Y.

SIDE-FORCE AND DANGER INDICATOR.

1,356,823.   Specification of Letters Patent.   Patented Oct. 26, 1920.

Application filed July 11, 1917, Serial No. 179,884. Renewed February 28, 1920. Serial No. 362,065.

*To all whom it may concern:*

Be it known that I, MATHIAS J. KLEIN, a citizen of the United States, and resident of New York, in the borough of Manhattan, in the county and State of New York, have invented certain new and useful Improvements in Side-Force and Danger Indicators, of which the following is a specification.

This invention relates to indicators to be used on motor vehicles, (automobiles) and other vehicles, having three or more road wheels; its object being to show, in the first place, the danger to the vehicle of being turned over when the latter is moving in a curve at a more or less high speed, and secondly, to show the so-called "side-force" acting sidewise on the vehicle, to the right or to the left.

This specification is a continuation in part of my former application, side-force and danger indicators, Serial No. 834,114, filed April 24th, 1914; allowed Sept. 14, 1917; renewed March 22, 1918, Ser. No. 224,051.

The invention consists of straight or curved, or straight and curved communicating glass tubes, (the latter at their lower ends being usually connected by one glass tube common to all), with a liquid oscillating in said tubes, and connected to a base-plate, the latter having a dial on which are always two so called "danger-marks" (or "danger-hands," sometimes called "low danger-marks" or hands), which have fixed or variable positions on the dial; one of them acting for right hand turns, and the other for left hand turns of the vehicle; (if there are more than two danger-marks on the dial, two of them are only acting at a certain time, corresponding to a certain load of the vehicle. Said communicating glass tubes may or may not be connected at their upper ends by a glass (or some other kind of) tube; if they are not connected by a tube at their tops, then each of them must be open at its top, so that atmospheric air can go in and out, when the liquid in said tubes is oscillating. The level of the oscillating liquid in the communicating glass tubes is acting as an index-hand on said dial, and may oscillate or turn around a fixed point, the so-called "turning center" of the indicator, for right and left hand turns of the vehicle; or said liquid level may turn around one fixed turning center for right hand turns, and around a second fixed turning center for left-hand turns (when moving on level roads), said turning center thereby jumping from one point to another point; or said liquid level may turn around more than two fixed turning centers; or said liquid level may turn around a center which changes its place on the instrument gradually from one place to another place within the working range of the indicator, in this case the indicator has a so-called "wandering turning center." In this application only such indicators are described, which have "one fixed turning center" for the oscillating liquid level in said tubes, for right and left hand turns of the vehicle. The glass tube size (its internal diameter) on the right hand side of the indicator may be the same as on the left hand side, or the glass tube size on the right may be larger or smaller than on the left. The glass tubes in which the liquid level oscillates (or moves up and down) may be straight on the right and left hand side; or they may be curved, (circular or otherwise), on both sides of the indicator; or they may be partly straight and partly curved on each side of the indicator.

The positions of the two acting danger-marks or hands on the dial have a fixed relation to the position of the center of gravity of the vehicle, carrying a certain load.

Said dial may be without a scale or pair of scales, but usually it is provided with one pair (or more pairs) of scales; the latter may be non-variable (constant) or variable scales (so-called "side-force scales"). The liquid level of the oscillating liquid in the communicating glass tubes acts as an index-hand on said dial, showing on said pair of scales, the side-force acting on the vehicle in a direct or indirect way, and when either of said acting danger-marks (or hands) is reached by said liquid level, the vehicle is turned over by said side-force to the right or to the left hand side. If therefore, (vehicle moving in any curve on a level or banked road), the liquid level (or index-hand) comes more or less near to one of said two acting danger-marks (or hands), the vehicle is more or less in danger of being turned over. The two acting danger-marks (or hands) change their positions on the dial usually with the load of the vehicle. The side-force scales show the side-force directly, and the non-variable (constant) scales indirectly; no scales on the dial would only show the turn-over danger of the vehicle, but the side-force of course, could be roughly estimated, as the index-hand (liquid level) changes its position between the zero-point and one of the acting danger-marks.

The definitions of "center line," of "side normals," of "side-force angle," of "turn over angle," of "turn over side-force," of "tangent of side-force angle," of "tangent of turn over angle" and "its value," is the same as in my former application above mentioned. (See the pages 2 to 3 and 7 to 8 of said application.) The side-force (acting always on the center of gravity of the loaded or unloaded vehicle, in the direction of said side normal), is shown by the index-hand (liquid level) of the indicator on a side-force scale of the dial, in percentage of the turn over side-force (not its absolute value), and said side-force increases in the same proportion as the tangent of the side-force angle increases. (See page 8 of said application filed April 24th, 1914.) The danger-marks (or hands) on the dial (corresponding to the turn over angles of the liquid level) represent always the 100% (100s) side-force (the turn over side-force of the vehicle), and are marked with 100s, but may be marked in some other way; if the liquid level (or index-hand) reaches, for instance, the 20s mark of a side-force scale, when the vehicle is turning in a curve, a side-force of 20s or 20% (that is 20/100 or 1/5 of the turn over side-force) is shown. 100 times the tangent of the turn over angle, would give the position of the corresponding danger-mark (or hand) on a non-variable grade scale; this is the fixed relation between the positions of the danger-marks (or hands) on the dial, and the position of the center of gravity of the loaded or unloaded vehicle. If the vehicle stands (or moves straight) on a level road, the liquid level (or index-hand) of the oscillating liquid in the glass tubes must point to the zero-mark of the dial (showing a side-force of 0%). The line of said zero-point (or mark) to the turning center of the liquid level, is the so-called "zero-line" of the dial, which has always a horizontal position, when the vehicle is standing on a level road. On one scale of each pair of scales, is shown the side-force for right hand turns, and on the other scale of said pair of scales is shown the side-force for left hand turns of the vehicle; said indicator is therefore a "double acting indicator," or a "double acting side-force and danger indicator."

In the foregoing, the two acting danger-marks (or hands) are placed usually at 100s side-force, but they may be placed at a lower mark than 100s, for instance, at 90s (or 85s) side-force, which is or may be called the "lower limit of the danger zone"; in that case the tangent of the corresponding side-force angle (corresponding to 90s) is only 90/100 or 9/10 of the tangent of side-force angle (called turn over angle), which corresponds to 100s side-force. In such case, I call said marks (or hands) "low danger-marks" or "low danger-hands." Now the turning vehicle will not turn over when one of the two acting low danger-marks (or hands) is reached by the liquid level or index-hand, that is at 90s (or 85s) side-force, but the danger of turn over of the vehicle is not far away.

Should a more or less strong wind power act on one side of the turning vehicle, the turn over side-force is not at 100s side-force, but somewhat higher or lower than 100s.

Said double acting side-force and danger indicator must be mounted on a four wheeled vehicle (the latter standing on a level road), in such a way that the oscillation or turning axis of the liquid level is parallel and near to the center line of the vehicle and its liquid level (or index-hand) points to the zero-point, otherwise its place on the vehicle is optional, in other words, said indicator may be shifted in said center line, without changing its indications; it is usually placed on the dashboard of the motor vehicle in front of the vehicle driver.

On a four wheeled vehicle, said double acting indicator always gives correct indications when the vehicle is turning on a level or banked road, but on a three wheeled vehicle the indications of said double acting indicator are only nearly correct.

In the accompanying drawing:

Figure 1 is a front view, and Fig. 2 a horizontal section (through line $h$ $h^1$) of a double acting side-force and danger indicator, with circular curved communicating glass tubes of equal size, and a pair of (constant) grade scales on its dial;

Fig. 3 is a front view of a double acting indicator, having straight and parallel communicating glass tubes of equal size, and a pair of side-force scales on its dial;

Fig. 4 is a horizontal section through line $h^2$ $h^3$ of Fig. 3;

Fig. 5 is a front view of an indicator, having straight and parallel communicating glass tubes of unequal size, and a pair of (constant) grade scales on its dial;

Fig. 6 is a horizontal section through $h^4$ $h^5$ of Fig. 5;

Fig. 7 is a front view of a double acting indicator, having circular curved communicating glass tubes of unequal size, and no scale or pair of scales on its dial;

Fig. 8 is a front view of an indicator, having straight and parallel communicating glass tubes of unequal size, and a pair of constant degree scales on its dial;

Fig. 9 is a horizontal section through line $h^8$ $h^9$ of Fig. 8;

Fig. 10 is a front view of an indicator, with circular curved communicating glass tubes of unequal size, and a pair of side-force scales on the dial;

Fig. 11 is a front view, and Fig. 12 a horizontal section (through line $h^{12}$ $h^{13}$) of a double acting indicator, having straight and parallel communicating glass tubes of unequal size, and a plurality of pairs of side-force scales on its dial;

Fig. 13 is a front view, and Fig. 14 a horizontal section (through line $h^{14}$ $h^{15}$) of an indicator, having circular curved communicating glass tubes of equal size, and a plurality of pairs of side-force scales on the dial, corresponding to a plurality of different vehicle loads.

In Figs. 3, 5, 8 and 11, the straight and parallel communicating glass tubes are all normal to the zero-line of the indicator.

Fig. 15 shows the front view of an indicator, having straight and parallel communicating glass tubes of equal size, which are not normal to the zero-line, and a pair of grade scales on the dial.

The Figs. 16 and 18 show the front views of two double acting indicators, which have straight and parallel communicating glass tubes of equal size for right hand turns, and also for left hand turns, but the latter tubes are not parallel to the former ones, and none of said tubes is normal to the zero-line of the indicator. The dial of Fig. 16 has a pair of grade scales, but the dial of (the indicator shown in) Fig. 18 has no scale or pair of scales.

By turning the Fig. 16 indicator around its turning center of a certain angle, the indicator, shown in a front view in Fig. 17 is obtained, in which the straight and parallel communicating glass tubes for right hand turns are normal to the zero-line, but the latter is not normal to the communicating tubes for left hand turns.

In the Figs. 1, 7 and 10, the turning center of the oscillating liquid is also the circle center of the circular curved glass tubes, but in the double acting side-force and danger indicators shown in the Figs. 19 and 20, in front views, the turning center of the oscillating liquid level is not the circle center of the circular curved communicating glass tubes. On the dial of each of the two indicators is shown a pair of side-force scales.

Fig. 21 shows in a front view a double acting indicator, which has for right hand turns of the vehicle, circular curved communicating glass tubes of equal size, and for left hand turns, straight and parallel tubes of equal size; the dial of the indicator is provided with a pair of side-force scales.

The oscillating liquid in the communicating glass tubes is a non-freezing liquid; the level of the later oscillates around a fixed center in each of the indicators shown in the Figs. 1 to 21.

Similar letters of reference indicate corresponding parts in all figures.

In the double acting indicator arrangement shown in the Figs. 1 and 2, the circular curved communicating glass tubes T and $T^1$ of equal size, having their circle centers at $t$, are connected at their lower ends by the thin glass tube $T^0$. They are filled up to the horizontal level $h$ $t$ $h^1$ (the zero-line of the indicator) with said non-freezing liquid, and connected to the base-plate A, (the latter is connected with the screws $p$, $q$, $p^1$ $q^1$ and $t$ $t^0$, to the dashboard D of a motor vehicle), said base-plate having a dial with a pair of non-variable (constant) grade scales $h$ $c$ and $h^1$ $d$; $h$ $c$ acting for right hand turns, and $h^1$ $d$ for left hand turns of the vehicle. Each of the glass tubes T and $T^1$ has a small opening at its upper end to allow air to go in and out of said tubes when the liquid level is oscillating (around the turning center $t$,) in the glass tubes $T$, $T^0$ and $T^1$. The danger-hands H and $H^1$, turning around the axis $t$ $t^0$, are kept in their positions by the hand screw $k$; usually H and $H^1$ change their positions on the dial of the indicator when the load of the vehicle is changed. H points to 65g and $H^1$ to 70g of said grade scales, therefore, the tangent of the turn over angle for right hand turns of the vehicle is 0.65, and for left hand turns 0.70. If now the vehicle is turning to the right hand side on a level or banked road, and the liquid level in said glass tubes reaches to 13g of grade scale $h$ $c$, the side-force acting on the vehicle is 13/65 (that is 1/5 or 20%) of the turn over side-force (equivalent to 20s); if the liquid level would come by a higher speed of the vehicle in the position $b$ $t$ 65g (that is, reach the danger-mark H), the vehicle would be turned over to the left hand side, and if by a left hand turn of the vehicle, the liquid level would reach the position $b^1$ $t$ 70g (or danger-mark $H^1$), 100s side-force (the turn over side-force) would be shown and the vehicle would turn over to the right hand side.

In the double acting side-force and danger indicator shown in the Figs. 3 and 4, the straight and parallel communicating glass tubes $T^2$ and $T^3$ of equal size, are connected at their lower and upper ends by the glass tubes $T^4$ and $T^5$ respectively, and filled with a non-freezing liquid up to the horizontal level $h^2$ $t^1$ $h^3$ (the zero-line), which is normal to the glass tubes $T^2$ and $T^3$. The turning center $t^1$ of the oscillating liquid level in said tubes is midway between $T^2$ and $T^3$; said glass tubes are connected to a base-plate $A^1$, which is connected to the dashboard of a four-wheeled motor vehicle by means of the screws $p^2$ and $p^3$. The dial $c^1 d^1$ on base plate $A^1$ is provided with a pair of side-force scales $O \ c^1$ for right hand turns, and $O \ d^1$ for left hand turns of the vehicle; the danger-marks 100s by $c^1$ and $d^1$ have the position 55g of a grade scale that means, the tangent of the turn over angle for right and left hand vehicle turns is 0.55. The level of the oscillating liquid in said glass tubes shows the side-force acting on the turning vehicle directly on said pair of side-force scales; if said liquid level or index-hand reaches, for instance, the 50s mark, a side-force of 50s, that is 50% or ½ of the turn over side-force is shown, the liquid levels $b^2 \ t^1$ and $b^3 \ t^1$ are the danger-mark levels. For another load of the vehicle (with other turn over angles), another pair of side-force scales has to be connected to the base plate $A^1$.

The indicator shown in Figs. 5 and 6, consists of the straight and parallel communicating glass tubes $T^6$ and $T^7$ of unequal size, which are normal to zero-line $h^4 \ t^3 \ h^5$, and connected at their lower ends by a glass tube $T^8$; they are filled with a liquid up to said zero-line and connected to base plate $A^2$; the dial $c^2 \ d^2$ of the indicator is provided with a pair of grade scales $O \ c^2$ for right hand turns, and $O \ d^2$ for left hand vehicle turns. The danger-hands $H^2$ and $H^3$ turn around $t^3$, which is the turning center of the oscillating liquid in said glass tubes; a pin connected to $H^2$ slides in slot $n$, and another one connected to $H^3$ slides in slot $n^1$, whereby the ends of the hands $H^2$ and $H^3$ are moved straight up and down on the scales $c^2 \ a^2$; said indicator is connected to the dashboard $D^1$ of a four wheeled motor vehicle by means of the screw $p^4 \ q^4$, $p^5$ and $t^3 \ t^4$. The oscillating liquid level (or index-hand) shows on said pair of grade scales, the side-force (acting on the turning vehicle) indirectly, in the way as in the indicator shown in the Figs. 1 and 2; the scale divisions on the latter are decreasing in size near the danger-hands, while the scale divisions in the Fig. 5 indicator are constant. The danger-hands $H^2$ and $H^3$ point each to 72g of said grade scales; the tangent of the turn over angle of the vehicle is therefore 0.72; if for another load of the vehicle, said tangent would be 0.60 for right and left hand turns, then the danger-hands $H^2$ and $H^3$ are shifted each to 60g by means of handscrew $k^1$. If for the big glass tube $T^6$, the glass tube $T^9$ (equal in size to $T^7$) would be substituted, the new indicator would work exactly in the same way as the former one and having the same scales and scale divisions, but would be of larger size; $H^2 \ t^3 \ b^4$ and $H^3 \ t^3 \ b^5$ are the danger levels of the oscillating liquid.

In the double acting side-force and danger indicator shown in a front view in Fig. 7, the circular curved communicating glass tubes $T^{10}$ and $T^{11}$, of unequal size, with their circle centers at $t^5$, are connected at their lower and upper ends by the glass tubes $T^{12}$ and $T^{13}$, and connected to the base plate $A^3$, which is connected to the dashboard of a motor vehicle by means of screws at $t^5$ and $p^6$; the horizontal section through $h^6 \ h^7$ is about the same as the section shown in Fig. 6. Said glass tubes are filled with a liquid up to the zero-line $h^6 \ t^5 \ h^7$; the danger-hands $H^4$ and $H^5$ are turning around the turning center $t^5$ of the oscillating liquid level in said tubes, and are kept in their positions by means of the handscrew $k^2$; $H^4$ (acting for right hand turns) has the position 78g of a grade scale, and $H^5$ (acting for left hand turns of the vehicle) has the position 80g; the tangents of the turn over angles are therefore, 0.78 for right hand turns, and 0.80 for left hand turns. The dial $c^3 \ o \ d^3$ has no scale or pair of scales, therefore, the side-force acting on the turning vehicle can only be roughly estimated, as the liquid level (or index-hand) changes its position between 0 and 100s of the danger-hands; if, however, said liquid level reaches one of the danger levels $b^6 \ t^5 \ H^4$ or $b^7 \ t^5 \ H^5$, the vehicle is turned over. For another load of the vehicle, said danger-hands (as a rule) change their positions on the dial. If for the big circular curved glass tube $T^{10}$, the narrow circular curved glass tube $T^{14}$ (equal in size to $T^{11}$) would be substituted, the new indicator would work exactly in the same way as the former one, but would be of much larger size.

In the double acting indicator shown in the Figs. 8 and 9, the straight and parallel communicating glass tubes $T^{15}$ and $T^{16}$ of unequal size, are connected at their lower and upper ends by the narrow glass tubes $T^{17}$ and $T^{18}$, and connected to base plate $A^4$, which is connected to the dashboard of a motor vehicle by means of the screws $p^7$ and $p^8$; said glass tubes are filled with a liquid up to zero-line $h^8 \ h^9$, which is normal to the glass tubes $T^{15}$ and $T^{16}$. The dial $c^4 \ d^4$ is provided with a pair of (constant) "degree scales" (90° is equal to a right angle); $O \ c^4$ acting for right hand turns, and $O \ d^4$ for left hand turns of the vehicle. The danger-marks 100s are each at 50° of said pair of degree scales; the turn over angles $h^9 \ t^6 \ b^9$ and $h^9 \ t^6 \ b^9$ are 50°. As the tangent of 50° is 1.19, said danger-marks have the positions 119g of a grade scale pair. The oscillating liquid level in said glass tubes shows the side-force acting on the turning vehicle indirectly; if for instance, said liquid level would reach the 25° mark on one of said pairs of degree scales, the side-force acting on the vehicle would not be 25/50 or 1/2 (50s) of the turn over side-force, but 0.466/1.19=0.39 or 39s, because the tangent of 25° is 0.466, and of 50°=1.19; it shows that degree scales are more inconvenient than grade scales on side-force indicators.

In the double acting indicator shown in a front view in Fig. 10, the circular curved communicating glass tubes $T^{19}$ and $T^{20}$ of unequal size, with their circle centers at $t^8$, are connected at their lower ends by the glass tube $T^{21}$; they are filled with a liquid up to the zero-line $h^{10}$ $h^{11}$, and connected to base plate $A^5$, which is connected to the dashboard of a motor vehicle by means of the screws $p^9$ and $p^{10}$. The dial of the indicator is provided with a pair of side-force scales $O$ $c^5$, and $O$ $d^5$, $O$ $c^5$ acting for right and $O$ $d^5$ for left hand turns of the vehicle; the danger-marks 100s have the position 128g of a grade scale, or 52° of a degree scale, because the tangent of 52°=1.28. The oscillating liquid level (as index-hand) shows the side-force acting on the turning motor vehicle in a direct way (as is also the case by the indicator shown in the Figs. 3 and 4). For another load of the vehicle, having turn over angles larger or smaller than 52°, another pair of side-force scales has to be connected to the dial of the indicator.

The straight and parallel communicating glass tubes $T^{22}$, $T^{23}$ and $T^{24}$ of unequal size shown in the Figs. 11 and 12, are connected at their lower ends by the glass tube $T^{25}$, they are filled with a liquid up to the zero-line $h^{12}$ $h^{13}$, (which is normal to the tubes $T^{22}$, $T^{23}$ and $T^{24}$), and connected to the base plate $A^6$, which is connected to the dashboard of a motor vehicle by means of the screws $p^{11}$ and $p^{12}$. The dial of said double acting indicator is provided with 5 pairs (1, 2, 3, 4 and 5, a plurality) of side-force scales, corresponding to 5 (a plurality of) different vehicle loads; the tangents of their turn over angles for right hand vehicle turns are respectively 0.90, 0.81, 0.73, 0.66 and 0.60, and the tangents of their turn over angles for left hand turns are respectively, 0.90, 0.81, 0.73, 0.65 and 0.60. $t^9$ is the turning center of the oscillating liquid level in said glass tubes; said liquid level (or index-hand) shows on said side-force scales the side-force directly. If, for instance, load 2 is used on the vehicle, and the liquid level by a right hand turn reaches to the 75s mark on the scale pair 2, the side-force acting on the vehicle is 75s, that is 75/100 or 3/4 of the turn over side-force.

The double acting indicator shown in the Figs. 13 and 14 has the circular curved communicating glass tubes $T^{26}$, $T^{27}$, $T^{28}$ and $T^{29}$ of equal size, which are connected at their lower ends by the glass tube $T^{30}$; they are filled with a liquid up to the zero-line $h^{14}$ $h^{15}$, and connected to base plate $A^7$, which is connected to the dashboard of a four wheeled motor vehicle by means of the screws $p^{13}$ and $p^{14}$. $t^{11}$ is the turning center of the oscillating liquid level in said glass tubes, but $t^{11}$ is not the circle center of the tubes $T^{26}$, $T^{27}$, $T^{28}$ and $T^{29}$; the circle radius of tubes $T^{26}$ and $T^{29}$ must be the same, and also the circle radius of the tubes $T^{27}$ and $T^{28}$ must be the same. The dial of said indicator is provided with a plurality of 6 pairs of side-force scales, marked 1, 2, 3, 4, 5 and 6 respectively, corresponding to 6 different vehicle loads; the tangents of their turn over angles for right and left hand turns of the vehicle are respectively, 1.15, 1.05, 0.96, 0.88, 0.81 and 0.75. The oscillating liquid level shows on said side-force scales the side-force acting on the turning vehicle directly, in the same way as on the indicator shown in Figs. 12 and 13. Each pair of side-force scales is used for a certain load of the vehicle.

All the glass tubes of the double acting side-force indicators shown in front views in the Figs. 15 to 21, are connected to base plates (not shown in the figures), which are connected to the dashboards of four wheeled motor vehicles.

The indicator shown in Fig. 15 consists of the straight and parallel communicating glass tubes $T^{31}$ and $T^{32}$ of equal size, which are connected at their lower ends by the glass tube $T^{33}$, and filled with a liquid up to the horizontal zero-line $h^{36}$, $t^{13}$, $h^{37}$; the dial of the indicator is provided with a pair of grade scales; the danger-mark 100s for right hand turns of the vehicle has its position at 140g, and for left hand turns at 44g of said pair of grade scales; this unequalness may be prevented when said glass tubes are only filled up with a liquid to the horizontal line $h^{38}$ $t^{23}$ $h^{39}$. The line $e^6$ $t^{23}$ $t^{13}$ is parallel to and midway between the tubes $T^{31}$ and $T^{32}$; $t^{23}$ is the turning center of the oscillating liquid in the latter case, and $t^{13}$ in the former case. If the indicator when filled up to line $h^{36}$ $h^{37}$, would be turned around, $t^{13}$ (on the dashboard of the motor vehicle) by a certain angle (say 15°), so that $h^{16}$ $h^{17}$, normal to $T^{31}$ and $T^{32}$ would be the horizontal zero-line, the same danger-marks 100s would have the positions at 83g of a pair of grade scales for right and left hand turns of the vehicle, and the scale divisions would be constant, while the scale divisions (shown in the drawing) are decreasing at the lower end for right hand turns, and increasing at the upper end for left hand turns of the vehicle. The side-force acting on the turning vehicle, is shown by the oscillating liquid level in the tubes, on said pair of grade scales indirectly, and when said liquid level reaches one of the danger levels $b^{16}$ $t^{13}$ 100s or $b^{17}$ $t^{13}$ 100s, the vehicle is turned over.

The double acting indicator shown in Fig. 16, consists of the straight communicating glass tubes $T^{34}$, $T^{35}$, $T^{36}$ and $T^{37}$, all of equal size; $T^{34}$ is parallel to $T^{36}$ and $T^{35}$ to tube $T^{37}$; they are connected at their lower ends by the glass tube $T^{38}$, and filled with a liquid up to the zero-line $h^{18}$ $t^{14}$ $h^{19}$; $t^{14}$ is the turning center of the oscillating liquid level in said tubes; the line $e^7$ $t^{14}$, normal to $h^{18}$ $h^{19}$ is midway between the tube ends $h^{18}$ and $h^{19}$; the zero-line $h^{18}$ $h^{19}$ is not normal to any one of the tubes $T^{34}$, $T^{35}$, $T^{36}$ and $T^{37}$. The dial of the indicator is provided with a pair of grade scales; the danger-marks 100s for right and left hand turns have the positions each at 80g of said pair of grade scales; on the latter, the side-force acting on the turning vehicle, is shown indirectly by the oscillating liquid level of the indicator; when said liquid level reaches one of the danger-levels $b^{18}$ $t^{14}$ 100s, or $b^{19}$ $t^{14}$ 100s, the vehicle is turned over. If said indicator is turned around $t^{14}$ (Fig. 16) on the dash-board of the motor vehicle, by a certain angle, so that the tubes $T^{34}$ and $T^{36}$ are normal to the horizontal zero-line, the indicator shown in Fig. 17 is obtained with the zero-line $h^{40}$ $t^{14}$ $h^{41}$ normal to the tubes $T^{34}$ and $T^{36}$, but not normal to the tubes $T^{35}$ and $T^{37}$; the same danger-marks have now the positions 60g (for right hand turns) and 105g (for left hand turns) on a pair of grade scales; the scale divisions on tube $T^{36}$ (for right hand turns) are constant, but the scale divisions on tube $T^{37}$ (Fig. 17) are decreasing up to the danger-mark; in Fig. 16, the scale divisions of both scales of the scale pair are the same.

The indicator shown in Fig. 18, has the straight and parallel communicating glass tubes $T^{39}$ and $T^{41}$ acting for right hand turns, and the straight and parallel communicating glass tubes $T^{40}$ and $T^{42}$, acting for left hand turns of the vehicle, all communicating tubes being of equal size and connected at their lower ends by the glass tube $T^{43}$; $h^{20}$ $t^{15}$ $h^{21}$ is the horizontal zero-line (up to which said tubes are filled with a liquid) which is not normal to any one of said tubes $T^{39}$, $T^{40}$, $T^{41}$ and $T^{42}$; the line $e^8$ $t^{15}$, normal to $h^{20}$ $h^{21}$, is midway between the communicating tubes $T^{39}$ $T^{40}$ and $T^{41}$ $T^{42}$; $t^{15}$ is the turning center of the oscillating liquid level in said tubes. The dial of the indicator has no scale or pair of scales; the danger-marks 100s have the positions 85g, that means 0.85 is the tangent of the turn over angle for right and left hand turns of the vehicle. The side-force acting on the turning vehicle can only be estimated, according to the position of the oscillating liquid level between 0 and the danger-marks 100s; if however, said liquid level reaches one of the danger-levels $b^{20}$ $t^{15}$ 100s, or $b^{21}$ $t^{15}$ 100s, the vehicle is turned over, in the first case to the left, and in the second case to the right hand side. If the big tubes $T^{44}$ nearer to $t^{15}$, would be substituted for the narrow tubes $T^{39}$ $T^{40}$, and having the same turning center $t^{15}$ for the oscillating liquid level, the new indicator would work exactly as the former one, but would be of smaller size.

The double acting indicator shown in Fig. 19, consists of the circular curved communicating glass tubes $T^{45}$ and $T^{46}$ (of equal size and equal circle radius), which are connected at their lower and upper ends by the tubes $T^{47}$ and $T^{48}$ respectively; they are filled with a liquid up to the horizontal zero-line $h^{22}$ $t^{16}$ $h^{23}$; the line $e^9$ $t^{16}$ normal to $h^{22}$ $h^{23}$, is midway between the tubes $T^{45}$ and $T^{46}$, and $t^{16}$ is the turning center of the oscillating liquid level in said tubes, but $t^{16}$ is not the circle center of the tubes $T^{45}$ and $T^{46}$. The dial of the indicator has a pair of side-force scales, on which the oscillating liquid level (or index-hand) shows the side-force directly; the tangent of the turn over angle for right hand turns is 0.93, and for left hand turns 0.90, and when said liquid level reaches one of said danger-levels $b^{22}$ $t^{16}$ 100s, or $b^{23}$ $t^{16}$ 100s, the vehicle is turned over.

The indicator shown in Fig. 20, consists of the circular curved communicating glass tubes $T^{49}$ and $T^{50}$ (of equal size and equal circle radius), which are connected at their lower and upper ends by the tubes $T^{51}$ and $T^{52}$ respectively; they are filled with a liquid up to the horizontal zero-line $h^{24}$ $t^{17}$ $h^{25}$; the line $e^{10}$ $t^{17}$, normal to $h^{24}$ $h^{25}$, is midway between the tubes $T^{49}$ and $T^{50}$, and $t^{17}$ is the turning center of the oscillating liquid level in said tubes, but $t^{17}$ is not the circle center of the tubes $T^{49}$ and $T^{50}$. The dial of the indicator is provided with a pair of side-force scales, on which the oscillating liquid level shows the side-force directly; the danger-marks 100s have the positions 100g of a grade scale for right and left hand turns; the tangent of the turn over angle is therefore 1.00, or the turn over angle itself is 45° for right and left hand turns of the vehicle; in this case, the pair of side-force scales (in Fig. 20) is identical with a pair of non-variable grade scales, and when the oscillating liquid level reaches, for instance, the 60s or 60g mark, a side-force is shown. If for another load of the vehicle, the tangent of the turn over angle would be 0.90 (which is the tangent of 42°), another pair of side-force scales (not identical with a pair of grade scales) has to be connected to the dial. The danger-levels $b^{24}$ $t^{17}$ 100s is normal to the danger-level $b^{25}$ $t^{17}$ 100s, because the angle $b^{24}$ $t^{17}$ $h^{24}$ is 45°, equal to angle $h^{24}$ $h^{17}$ $b^{25}$. The circle radius of the tubes $T^{49}$ and $T^{50}$ must be the same, otherwise, the turning center of the oscillating liquid level in said tubes would not be a fixed point, but a wandering turning center of the indicator, moving from one point to another point for different side force angles.

The same is the case by the Fig. 19 indicator, where the circle radius of tube $T^{45}$ must be equal to the circle radius of tube $T^{46}$, otherwise its turning center of the oscillating liquid level would be a wandering turning center.

Instead of having the glass tubes $T^{45}$ and $T^{46}$ (Fig. 19) curved circular, said tubes might be curved otherwise, for instance, parabolic or hyperbolic, but both tubes must be of the same size and curvature, in order to have a fixed turning center on the indicator for the oscillating liquid level in said tubes.

In the same way, the circular curved glass tubes $T^{49}$ and $T^{50}$ of Fig. 20, may be curved otherwise; they may be (for instance), the parts of an ellipse, having the axes $e^{10}$ $t^{17}$ and $h^{24}$ $h^{25}$; and for tubes $T^{51}$ and $T^{52}$, the glass tubes $T^{53}$ and $T^{54}$ may be substituted; the new indicator with the tubes $T^{49}$, $T^{50}$, $T^{53}$ and $T^{54}$, would work in the same way as the former one, and having the same fixed turning center $t^{17}$ for the oscillating liquid level in said tubes.

The double acting side-force and danger indicator shown in Fig. 21, consists of the circular curved communicating glass tubes $T^{55}$ and $T^{57}$ of equal size, with their circle centers at $t^{18}$, acting for right hand turns, and the straight and parallel communicating glass tubes $T^{56}$ and $T^{58}$ of equal size acting for left hand turns of the vehicle; said tubes are connected at their lower and upper ends by the glass tubes $T^{59}$ and $T^{60}$, and are filled with a liquid up to the horizontal zero-line $h^{26}$ $t^{18}$ $h^{27}$; $t^{18}$ is the fixed turning center of the oscillating liquid level in said tubes. The dial of the indicator is provided with a pair of side-force scales, with their danger-marks 100s at 110g (of a grade scale pair) for right and left hand turns of the vehicle. The oscillating liquid level in said tubes shows (as index-hand) on said pair of side-force scales, the side-force acting on the turning vehicle directly, and whenever said liquid level reaches one of the danger-levels $b^{26}$ $t^{18}$ 100s or $b^{27}$ $t^{18}$ 100s, the vehicle is turned over. $e^{11}$ $t^{18}$ is normal to the zero-line $h^{26}$ $h^{27}$.

The lines $e$ $t$ of Fig. 1, $e^1$ $t^1$ of Fig. 3, $e^2$ $t^3$ of Fig. 5, $e^3$ $t^6$ of Fig. 8, $e^4$ $t^9$ of Fig. 11, and $e^5$ $t^{11}$ of Fig. 13, are all normal to the corresponding zero-lines.

The five indicators, shown in the Figs. 3, 5, 8, 11 and 15, with straight and parallel communicating glass tubes, have their fixed turning centers for the oscillating liquid level in the tubes, always in the corresponding $e$ lines, whether they are filled with a liquid up to the original zero-line, or filled up higher or lower. If in Fig. 3, the glass tubes would be filled with a liquid up to the level $h^{28}$ $t^{19}$ $h^{29}$ (instead of to level $h^2$ $t^1$ $h^3$), $t^{19}$ in line $e^1$ $t^1$ would be the fixed turning center of the oscillating liquid level, and $h^{28}$ $h^{29}$ the new zero-line. If in Fig. 5, the glass tubes would be filled up to level $h^{30}$ $t^{20}$ $h^{31}$, $t^{20}$ in line $e^2$ $t^3$ would be the turning center; the grade scale pair would have to be shifted lower down by the length $t^3$ $t^{20}$. When in Fig. 8, the glass tubes would be filled up to the horizontal level $h^{32}$ $t^{21}$ $h^{33}$, $t^{21}$ in line $e^3$ $t^6$ would be the fixed turning center of the oscillating liquid level; and when in Fig. 11, the communicating glass tubes would be filled up to the level $h^{34}$ $t^{22}$ $h^{35}$, the point $t^{22}$ in line $e^4$ $t^9$ would be the turning center of the oscillating liquid level in said tubes, and the various pairs of scales would have to be shifted accordingly, without changing their constant scale divisions for the same loads. Said scale divisions would not be constant (equal), if the straight and parallel communicating glass tubes of the five indicators, shown in the Figs. 3, 5, 8, 11 and 15, would not be normal to their zero-lines, or if said indicators would be turned on the dashboard of the motor vehicle by a certain angle, around an axis parallel to the center line of the vehicle.

The ten indicators, shown in the Figs. 1, 7, 10, 13, 16, 17, 18, 19, 20 and 21, must all be filled with a liquid up to the zero-line shown in the figures, in order to have a fixed turning center for the oscillating liquid level in the communicating glass tubes; if they are filled up with a liquid to a lower or higher level, they will not have a fixed turning center, but a wandering turning center, or partly a wandering and partly a fixed turning center for the oscillating liquid level in said glass tubes.

The three indicators, shown in the Figs. 1, 7 and 10, with circular curved communicating glass tubes of equal or unequal size, which have their circle centers at one point, which is the turning center of the oscillating liquid level in the glass tubes, may be turned on the dashboard of the motor vehicle by a certain angle, around an axis parallel to the center line of the vehicle; said turning of the indicator on the dashboard of the motor vehicle would not change the scales or scale divisions on the dial, said scales have only to be shifted, so that their zero-points would lie in the new zero-lines. All the 12 other indicators (shown in the drawing), when turned on the dashboard of the vehicle by a certain angle, will change their scales and scale divisions on the dial more or less.

The indicators shown in the Figs. 8, 15, 16, 17 and 18 show the side-force acting on the turning vehicle only for one load of the vehicle; if different loads (having different turn over angles) are used, the danger-marks have to be shifted correspondingly, which may be done as shown in Figs. 11 and 12 of the original specification filed April 24, 1914, or in a similar way.

In order to bring the oscillations of the liquid level in the communicating glass tubes quickly to rest, different methods are used. In the indicators shown in the Figs. 1 and 8, thin glass tubes $T^0$ and $T^{17}$ are used for connecting the communicating glass tubes at their lower ends; in the Figs. 3, 7, 10, 11, 13, 15, 16, 17, 18, 19, 20 and 21, the lower connecting tubes are reduced in size by $i, i^1, i^2, i^3, i^4, i^5, i^6, i^{6\prime}, i^7, i^8, i^9$ and $i^{10}$ respectively, and in Fig. 5, small holes on the top of the straight vertical glass tubes $T^6$ and $T^7$ are used.

A vehicle, moving straight on a banked road, shows also a side-force on the dial; in that case said side-force when shown on a grade scale, represents the banking grade of the road.

Said communicating glass tubes are usually connected at their lower ends by one glass tube (straight or curved in any way), but more than one tube may be used for the same purpose.

I have illustrated and described preferred and satisfactory embodiments of my invention, but it is obvious that changes may be made therein within the spirit and scope thereof, as defined in the appended claims.

Having thus described my invention, I claim as new, and desire to secure by Letters Patent:

1. The combination of a four wheeled vehicle with a double acting side-force and danger indicator, the latter consisting of a base-plate, communicating glass tubes with a liquid oscillating in them on said base-plate, the level of said liquid oscillating around a fixed center of the indicator for right and left hand turns of the vehicle, a dial on said base-plate having two adjustable danger-hands, the adjusted positions of said danger-hands on said dial being determined by the position of the center of gravity of the loaded vehicle, the plane of said communicating glass tubes with the zero-line of the dial being normal to the center line of the vehicle, the latter being near to the center of the indicator, the level of said oscillating liquid in said glass tubes acting as an index on said dial, and showing on the latter when the vehicle is moving in a curve on a level or banked road, the increased danger of the vehicle being turned over, when the level of said oscillating liquid comes more or less close to one of said two danger-hands.

2. The combination of a four wheeled vehicle with a double acting side-force and danger indicator, the latter consisting of the combination of a base-plate, communicating glass tubes with a liquid oscillating in the latter on said base-plate, the level of said liquid oscillating around a fixed center of the indicator for right and left hand turns of the vehicle, a dial on said base-plate having two adjustable danger-hands and a pair of non-variable (constant) scales, the adjusted positions of said danger-hands on said dial being determined by the position of the center of gravity of the loaded vehicle, the plane of said communicating glass tubes with their zero-line being normal to the center line of the vehicle, the latter being near to the center of the indicator, the level of said oscillating liquid acting as an index on said scales, and showing on the latter when the vehicle is moving in a curve on a level or banked road, indirectly the side-force acting on the turning vehicle, and the increased danger of the latter being turned over, when the level of said oscillating liquid comes more or less close to one of said two danger-hands.

3. The combination of a four wheeled vehicle with a double acting side-force and danger indicator, the latter consisting of the combination of a base-plate, communicating glass tubes with a liquid oscillating in the latter on said base-plate, the level of said liquid oscillating around a fixed center of the indicator for right and left hand turns of the vehicle, a dial on said base-plate having two danger-marks and a pair of side-force scales, the positions of said danger-marks on said dial being determined by the position of the center of gravity of the loaded vehicle, the plane of said communicating glass tubes with their zero-line being normal to the center line of the vehicle, the latter being near to the center of the indicator, the level of said oscillating liquid acting as an index on said side-force scales, and showing on the latter when the vehicle is moving in a curve on a level or banked road, the side-force acting on the turning vehicle, and the increased danger of the latter being turned over, when the level of said oscillating liquid comes more or less close to one of said two danger-marks.

4. The combination of a four-wheeled vehicle with a double acting side-force and danger-indicator, the latter consisting of a base-plate, communicating glass tubes with a liquid oscillating in the latter on said base-plate, the level of said liquid oscillating around a fixed center of the indicator for right and left hand turns of the vehicle, a dial on said base plate having a plurality of pairs of side-force scales, corresponding to a plurality of different loads of the vehicle, the two 100s marks of each pair of scales being the two acting danger-marks on the dial, when said pair of scales is acting for a certain load of the vehicle, the positions of the two acting danger-marks (100s marks) on the dial being determined by the position of the center of gravity of the corresponding load of the vehicle, the plane of said communicating glass tubes with their zero-line being normal to the center line of the vehicle, the latter being near to the center of the indicator, the level of said oscillating liquid acting as an index on said scales, and showing on said acting pair of side-force scales when the vehicle is moving in a curve on a level or banked road, the side-force acting on the turning vehicle, and the increased danger of the latter being turned over, when the level of said oscillating liquid comes more or less close to one of said two acting danger-marks.

In testimony that I claim the foregoing as my invention, I have signed my name in presence of two subscribing witnesses.

MATHIAS J. KLEIN.

Witnesses:
H. N. STUART,
MOE M. WEINBERG.